(12) United States Patent
Goire et al.

(10) Patent No.: US 7,020,872 B1
(45) Date of Patent: Mar. 28, 2006

(54) METHOD FOR VERIFYING CODE TRANSFORMERS FOR AN INCORPORATED SYSTEM, IN PARTICULAR IN A CHIP CARD

(75) Inventors: Christian Goire, Les Clayes Sous Bois (FR); Thomas Jensen, Rennes Cedex (FR); Pascal Fradet, Rennes Cedex (FR); Daniel Le Metayer, Rennes Cedex (FR); Ewen Denney, Rennes Cedex (FR)

(73) Assignee: CP8 Technologies, Louveciennes (FR)

( * ) Notice: Subject to any disclaimer, the term of this patent is extended or adjusted under 35 U.S.C. 154(b) by 450 days.

(21) Appl. No.: 09/786,114

(22) PCT Filed: Jun. 28, 2000

(86) PCT No.: PCT/FR00/01815

§ 371 (c)(1),
(2), (4) Date: Jun. 8, 2001

(87) PCT Pub. No.: WO01/02955

PCT Pub. Date: Jan. 11, 2001

(30) Foreign Application Priority Data

Jul. 1, 1999 (FR) .................................. 99 08460

(51) Int. Cl.
*G06F 9/45* (2006.01)

(52) U.S. Cl. ........................ 717/143; 717/148; 717/153

(58) Field of Classification Search ................ 717/109, 717/139–148, 149, 137, 167, 154, 177, 153; 235/380, 492; 713/187, 193, 172, 200; 710/15; 702/189; 711/156, 154; 340/5.74; 707/103 R
See application file for complete search history.

(56) References Cited

U.S. PATENT DOCUMENTS

| | | | | | |
|---|---|---|---|---|---|
| 4,736,320 | A | * | 4/1988 | Bristol | 717/109 |
| 5,161,231 | A | * | 11/1992 | Iijima | 710/15 |
| 5,293,424 | A | * | 3/1994 | Holtey et al. | 713/193 |
| 5,534,857 | A | * | 7/1996 | Laing et al. | 340/5.74 |
| 5,715,431 | A | * | 2/1998 | Everett et al. | 711/156 |

(Continued)

FOREIGN PATENT DOCUMENTS

FR    2 757 970 A    7/1998

OTHER PUBLICATIONS

Robert Lezec, Stephan le Gentil, Open solutions for mobile data services, Mar. 1999, Telecommunications, international edition, vol. 33, issue 3, p. 85-88.*

(Continued)

*Primary Examiner*—Tuan Dam
*Assistant Examiner*—Satish S. Rampuria
(74) *Attorney, Agent, or Firm*—Miles & Stockbridge P.C.; Edward J. Kondracki

(57) ABSTRACT

The invention relates to a method for verifying transformation (2) of a source code (1) into a transformed code (3) designed for an embedded system (7) such as in a smart card or other portable or mobile device including data processing resources. The method comprises at least the following steps: determining a single virtual machine that factors in the behavior of both of these codes (1, 3), determining for each source code (1) and transformed code (3) a plurality of auxiliary functions representing the residual differences between said source code (1) and transformed code (3), and a step for verifying a correspondence property between the auxiliary functions, the verification of the code transformation (2) being obtained from this last step.

11 Claims, 2 Drawing Sheets

U.S. PATENT DOCUMENTS

| | | | | |
|---|---|---|---|---|
| 5,856,659 | A * | 1/1999 | Drupsteen et al. | 235/380 |
| 5,889,941 | A * | 3/1999 | Tushie et al. | 713/200 |
| 5,923,884 | A * | 7/1999 | Peyret et al. | 717/167 |
| 5,987,256 | A * | 11/1999 | Wu et al. | 717/146 |
| 5,999,732 | A * | 12/1999 | Bak et al. | 717/148 |
| 6,005,942 | A * | 12/1999 | Chan et al. | 713/187 |
| 6,115,719 | A * | 9/2000 | Purdy et al. | 707/103 R |
| 6,128,774 | A * | 10/2000 | Necula et al. | 717/146 |
| 6,216,227 | B1 * | 4/2001 | Goldstein et al. | 713/172 |
| 6,233,683 | B1 * | 5/2001 | Chan et al. | 713/172 |
| 6,253,370 | B1 * | 6/2001 | Abadi et al. | 717/154 |
| 6,256,690 | B1 * | 7/2001 | Carper | 710/301 |
| 6,308,317 | B1 * | 10/2001 | Wilkinson et al. | 717/139 |
| 6,390,374 | B1 * | 5/2002 | Carper et al. | 235/492 |
| 6,481,632 | B1 * | 11/2002 | Wentker et al. | 235/492 |
| 6,546,549 | B1 * | 4/2003 | Li | 717/137 |
| 6,581,206 | B1 * | 6/2003 | Chen | 717/143 |
| 6,591,229 | B1 * | 7/2003 | Pattinson et al. | 702/189 |
| 6,594,738 | B1 * | 7/2003 | Sugibayashi | 711/154 |
| 6,728,950 | B1 * | 4/2004 | Davis et al. | 717/136 |
| 6,810,518 | B1 * | 10/2004 | Grimaud et al. | 717/146 |
| 2002/0100038 | A1 * | 7/2002 | Balassanian | 717/177 |

OTHER PUBLICATIONS

Rinald Di Giorgio, Mike Montgomery, Write OpenCard services for downloading Java Card apps; With this straight-forward loading information in hand, you can load Schlumberger's CyberFlex 16K or Dallas Semiconductor's iButton, Feb. 1, 1999, Javaworld, p. 1.*

Elana Varon, Smart cards break throgh, Dec. 21, 1998, Fedral Computer Week, vol. 12, issue 41, p. 21-23.*

Business/Technology Editors, Java Card Forum Accelerates Standardisation of Java Card API, Oct. 22, 1998, Business Wire, p. 1.*

IBM TDB Data base, Code Converage Measurement, Jan. 1, 1991.*

Preston Turner, Burson-Marsteller, Sun's Java technology leads open worldwide market for smart cards, May 12, 1999, M2 Presswire, p. 1.*

L Michael Guar, Mary Beth Guard, Get smart about smart cards, May/Jun. 1999, ABA Bank Compliance, issue 5, p. 25-31.*

Jefferey Kutler, Smart Cards: Java Gets Pats on Back From Card Businesses In Belgium and France, American Banker (Newspaper), Mar. 31, 1999, vol. 164, issue 61, p. 16.*

Tim Ritchey, JAVA!, Sep. 22, 1995, New Riders Publishing, p. 325-343.*

Zhiqun Chen, Java Card Technology for Smart Cards, Sun Microsystems, 1996, p. 11-16.*

Guthery, Java card: Internet computing on a smart card, IEEE, vol. 1, Issue 1, Jan.-Feb. 1997 Page(s):57-59.*

Cucinotta et al., A protocol for programmable smart cards, IEEE, Sep. 1-5, 2003 Page(s):369-374.*

Kaufman M et al: "NA Industrial Strength Theorem Prover for a Logic Based on Compon Lisp" ICCE Transactions on Software Engineering, US IEEE Inc. NY, vol. 23, No. 4 Apr. 1, 1997 pp. 203-213, XP000720014, ISSN: 0098-5589, entire document.

Alberda M I et al: "Using Formal Methods to Cultivate Trust in Smart Card Operating Systems" Future Generations Computer System, NL, Elsevier Science Publishing Amsterdam, vol. 13, No. 1, Jul. 1, 1997, pp. 39-54, XP004081708, ISSN: 0167 739X p. 53, lefthand column, line 2-line 33, Abstract.

* cited by examiner

METHOD FOR VERIFYING CODE TRANSFORMERS FOR AN INCORPORATED SYSTEM, IN PARTICULAR IN A CHIP CARD

FIELD OF THE INVENTION

The invention relates to a method for verifying code transformation of a for an embedded system.

The invention also relates to the application of such a method to a transformer or converter for generating a code for a chip card.

DESCRIPTION OF RELATED ART

In the context of the invention, the term "embedded system" should be considered in its most general sense. It specifically includes systems designed for a chip card, which constitutes the preferred application of the invention, but also any system designed for a portable or mobile device comprising means capable of processing computer data, which will hereinafter be called "processing resources."

Modern embedded systems are equipped with data processing resources that make it possible to fulfill increasingly complex and increasingly numerous functions. However, despite the arrival on the market of technologies and components that are increasingly high-performance, a distinctive characteristic of embedded systems, as compared to conventional computer systems (microcomputers, workstations, etc.), involves the limitations they impose on resources (memory size and microprocessor power especially). In order to satisfy these constraints, it is necessary to transform the code designed to be executed in an embedded system. The purpose of the transformations is to produce a code that is more efficient and less resource-intensive.

To illustrate the concept, and to give a non-limiting example of a code, the description below will center on a program written in a virtual machine in the "JAVA" language (a registered trademark of SUN MICROSYSTEMS), which has the advantage of being able to be executed in various environments. The fields of application of this language have multiplied considerably, particularly with the extensive growth of the Internet. Many computer applications of small size, called "applets," are written in this language and are executable by a "web" browser.

The description will also focus on the preferred application of the invention, i.e., the execution of a code of this type by computer resources specific to a chip card. As indicated above, despite substantial technological progress, the memory size of the chip card and the power of the microprocessor with which it is equipped remain relatively limited. It is also important for the code to be resident in the chip card, since the transmissions between the latter and a host terminal of any type, take place at low speed. The current standards only provide for serial transmissions. A need has therefore arisen for a code that can be qualified as "reduced," or in any case optimized for this use. To this end, it has been proposed to use a language derived from "JAVA," existing in the form of a limitation of this language, i.e. the language "JAVA CARD" (also a registered trademark of SUN MICROSYSTEMS).

An additional complication arises from the fact that embedded systems are generally used in environments that require the highest guarantees in terms of both reliability and security. For example, there are new versions of chip cards in which it is necessary to install multiple software applications that must cooperate harmoniously without revealing any confidential information. In fact, a priori, these multiple applications may involve different users. Despite the aforementioned cooperation, it is necessary to maintain strict partitioning, so that the information related to a given user remains confidential, or at least cannot be made available to a user who is not authorized to see it (read operations) and/or manipulate it (write operations and the like: erasure, modification). In addition to the "confidentiality" aspect, there are other things to be taken into account, including the so-called "integrity" requirement, data losses, illegal modifications, etc.

In terms of "source" code, in the sense of "initial code," for example the "byte code" in the aforementioned "JAVA" language, the latter offers all the necessary guarantees and fulfills the aforementioned requirements, the "byte code" being a program written in the virtual machine of the "JAVA" language. In fact, many tests have been performed, over long periods of time.

The so-called "transformed" code is obtained from the "source code" by means of a code transformer, which is generally outside the embedded system, but can also be resident in the latter. It is therefore necessary to show equivalence between the source code and the transformed code.

This can be done by guaranteeing that the transformations performed on the code do not in any way change its behavior (from an external point of view) and do not introduce any security loopholes. In other words, the initial code (before transformation) must, from a logical point of view, be equivalent to the resulting code (after transformation).

It is especially difficult to guarantee this property in general, because the transformations have a global effect on the code and on the representations of the data it manipulates. In a practical sense, the complexity implied by this operation does not allow it to be implemented under realistic economic and/or technological conditions. Moreover, it must be clearly understood that such needs have arisen only quite recently, particularly in connection with the development of the aforementioned multi-application and/or multi-user chip card technologies.

SUMMARY OF THE INVENTION

The object of the invention is to meet these needs, without requiring extremely long and expensive procedures.

The method according to the invention makes it possible to verify, in systematic and modular fashion, the accuracy of the code transformations.

Within the context of the invention, two intrinsically known formalisms will essentially be used: operational semantics and logical relations. For a more detailed description of these formalisms, it would be advantageous to refer, first of all, to the book by H. R. Nielson and F. Nielson entitled "*Semantics with Applications: A Formal Introduction*," Wiley, 1992, and secondly, to the book by J. Mitchell, "*Foundations for Programming Languages*," MIT Press, 1996.

According to an essential characteristic of the invention, the method for verifying code transformation consists of specifying the meaning of two codes by means of a common virtual machine parameterized by functions that will be called "auxiliary functions." The differences between the two codes are expressed and grouped into the aforementioned auxiliary functions. There are two versions of each auxiliary function: a version in the source code and a version in the transformed code. The first modules being identical, since they are common to both codes, there is no need to verify that they are equivalent. In order to show the equivalence of the two codes, one therefore need only show that the so-called auxiliary functions, considered two by two, are equivalent. These two subsets can be made much more complex than the two sets represented by the two codes, source and transformed, considered in their entirety. It follows that, according to the method of the invention, the difficulty inherent in the verification process is substantially reduced, and correlatively, the verification process becomes economically and technologically feasible.

The subject of the invention is a method for verifying transformation of of a so-called source code into a so-called transformed code designed for an embedded system, said source and transformed codes being associated with virtual machines, characterized in that it comprises at least the following steps:
  determining, for each of said source and transformed codes, a first common subset, constituting a single virtual machine that factors in the behavior of these two codes;
  determining, for each of said source and transformed codes, a second subset constituted by a plurality of so-called auxiliary functions, said auxiliary functions representing residual differences between said source and transformed codes;
  associating said auxiliary functions in pairs, a first auxiliary function of each pair belonging to said second subset associated with said source code and a second auxiliary function of each pair belonging to said second subset associated with said transformed code;
  verifying a given correspondence property between said auxiliary functions of all of said pairs; and
  verifying that said transformation of the source code into a transformed code by said converter satisfies said given correspondence property.

Another subject of the invention is the application of such a method to a transformer or converter for generating a code designed to be stored in a chip (smart) card.

BRIEF DESCRIPTION OF THE DRAWINGS

The invention will now be described in greater detail in reference to the attached drawings, in which.

The following will describe in detail the method for verifying code transformers according to the invention.

DETAILED DESCRIPTION OF THE INVENTION

Figure 1:
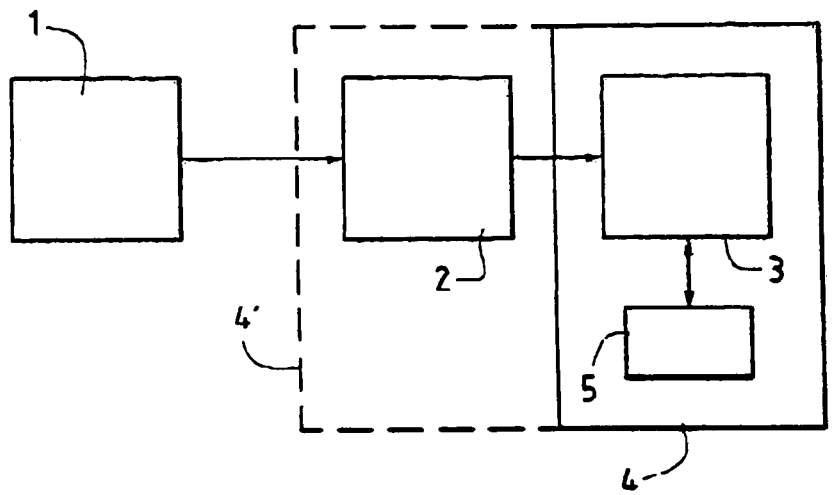
FIG. 1 schematically illustrates the process for transforming a source code into a final transformed code.

FIG. 1 schematically illustrates the method for transforming a code 1, which will be called a "source code" in the sense of an original or initial code, into a final code 3, called a "transformed code", by means of a code transformer or converter 2. The latter device can be a computing means or a specific piece of software. Ordinarily, the transformed code is designed to be resident in the embedded system 4 (solid line). The transformer or converter 2 can also be resident in or downloaded into the embedded system: reference 4' (broken line).

After being loaded into or stored in the embedded system 4–4', the transformed code 3 makes it possible to execute one or more tasks as necessary, represented by the single reference 5. The embedded system 4 is assumed to have standard autonomous computing resources (not represented).

A priori, the code transformation is performed once and for all by a given transformer 2, or on rare occasions, involves a modification of a version of the original code or source code 1, for example.

It is therefore necessary to be able to establish a formal proof that the transformed code 3 is equivalent to the source code 1. This process makes it possible to verify whether the transformer 2 is working correctly.

However, as mentioned, if the two sets formed by the source and transformed codes are considered in their entirety, the theory goes that such a determination is generally not realistically possible.

An essential characteristic of the method according to the invention will consist of finding, for each of the two codes, two subsets that will be called the first and second subsets. According to an important characteristic of the method according to the invention, the first subsets form a virtual machine common to the two codes, source and transformed. For this reason, it is not necessary to verify the equivalence of the first subsets.

On the other hand, the second subsets, constituted by the auxiliary functions, are different from one code to the other. The determination of the equivalence of the source and transformed codes is therefore reduced to determining the equivalence of all the pairs of auxiliary functions of the second subsets. The residual complexity of the auxiliary functions can be greatly reduced. It follows that determining the aforementioned equivalence becomes possible.

Figure 2A:
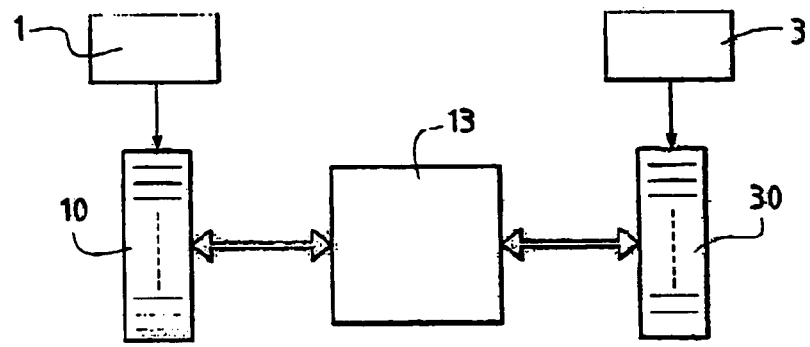
FIGS. 2A and 2B schematically illustrate one of the essential characteristics of the method according to the invention.
Figure 2B:
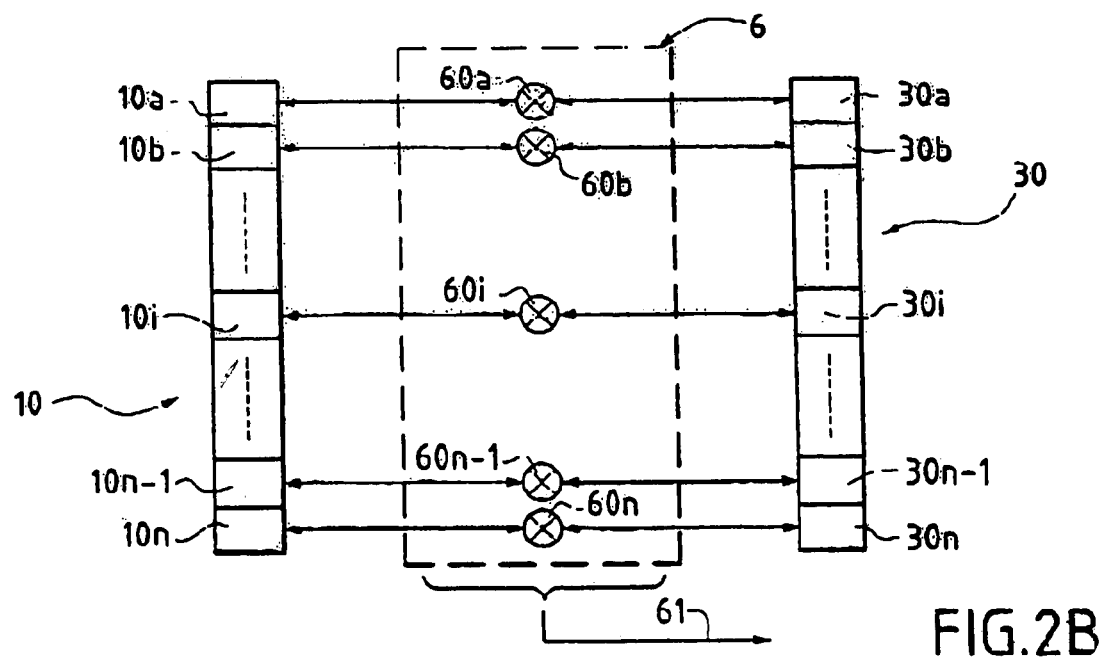

FIGS. 2A and 2B illustrate, in highly schematic fashion, the method according to the invention.

As shown more particularly in FIG. 2A, the first subsets of the source code 1 and the transformed code 3 form a common virtual machine 13. The second subsets, 10 and 30, are each constituted by a series of so-called auxiliary functions, the equivalence of which must be verified. These auxiliary functions 10 and 30 parameterize the common virtual machine 13.

The equivalence of the two codes, source 1 and transformed 2, is therefore reduced to verifying the equivalence of the auxiliary functions 10 and 30, two by two, as will be shown below in reference to FIG. 2B.

The steps of the method will now be described in greater detail.

The source and transformed codes are associated with first and second virtual machines, respectively.

The first step consists in defining a single virtual machine (or set of operational semantics) that makes it possible to factor in the behavior of the source code and the transformed code. The differences between the two codes therefore appear through auxiliary functions that will be interpreted or implemented differently in the two codes.

A virtual machine may be represented by a set of rules with the following form:

premise 1
.
.
.
premise n
state1[Instruction1] $\Rightarrow$ state2        (1).

The premises are either conditions for applying a rule, i.e. boolean expressions, or assignments of variables used to express a change of state. The premises use auxiliary functions to extract information on the state or to express conditions. Each rule indicates how the state of the machine changes when the premises are verified and the instruction "Instruction1" is encountered. One or more rules in this form are defined for each type of instruction in the code.

The second step consists in defining the data types or structures used in the two codes. It defines basic types, such as for example:

$$\text{Basic}::=\text{Nat}|\text{Bool}|\text{Name} \qquad (2),$$

or constructed types, for example:

$$\text{Environment}::=\text{Name}\bullet\text{Value}$$

$$\text{Instructions}::=\text{Instruction1}|\text{Instruction2}| \qquad (3),$$

The third step consists in interpreting the types, referenced•, used in the virtual machines. For each type•, it defines an interpretation for the source code $[[\bullet]]_S$ and an interpretation for the transformed code $[[\bullet]]_T$, plus a relation R. between the two interpretations $[[.]]_S$ and $[[.]]_T$. These relations, called logical relations, satisfy the structure of the types. For simple types, they must be explicitly defined: for structured types, they are deduced from the types of the components of the structure.

For example for the pairs:

$$(a, b)\, R_{\theta 1 \times \theta 2}(a', b') \Longrightarrow a\, R_{\theta 1} a'^{\frown} b\, R_{\theta 2} b' \qquad (4),$$

a relation wherein •1 and •2 are types and a, b, a' and b' are type elements.

The same is true for the functions:

$$f R_{\theta 1 \to \theta 2} f' \Longleftrightarrow \forall a, a'.a\, R_{\theta 1} a' \Longrightarrow f a\, R_{\theta 2} f'\, a' \qquad (5),$$

The logical relations must be "identity" relation for the observable types, i.e. the types for which it is desirable to show that the two codes produce the same result. These are usually types that are printable and/or displayable on a computer screen. They can be basic types, but also structured types representing, for example, a stack or variables of a given program.

The fourth step consists in interpreting the auxiliary functions used in the virtual machines. For each auxiliary function ƒ, its definition for the source code, written $[[f]]_S$, and its definition for the transformed code, written $[[f]]_T$, are given.

Determining the equivalence consists of showing that the definitions of the auxiliary functions correspond to the logical relations. More precisely, for each auxiliary function ƒ:•→•', we show $$[[f]]_S R_{\theta \to \theta'} [[f]]_T \qquad (6),$$

It follows that the two virtual machines are related, i.e. that:

$$[[\text{state}]]_S R_{type\text{-}state}[[\text{state}]]_T \qquad (7).$$

Since the relations are the identity for the observable types, the source and transformed codes are observationally identical.

The last step consists of showing that there exists a transformer• (FIG. 1:2) that satisfies the logical relations. This can be done by verifying that a given transformer•: S• T satisfies the logical relation associated with the type of its argument, S being the source code (FIG. 1:1) and T being the transformed code (FIG. 1:3). In order to do this, it is necessary for it to obey the following relation:

$$\forall x [[\theta]]_S.x\, R_\theta \Gamma(x) \qquad (8).$$

It has just been shown that the logical relations specify a set of constraints. It is therefore possible to extract the transformer 2 that is correct by construction, by applying refinement or extraction techniques, using one of the appropriate proof assistants.

The method according to the invention therefore offers an important advantage, since it allows for a substantial mechanization of the verification process, and above all makes it possible to perform it successfully, since this verification is performed on less complex subsets.

Since the transformation of the source code 1 can be described as a succession of simpler transformations, this method can be applied so as to show each transformation independently. It follows that it offers a the great advantage in terms of modularity.

The verification need only be performed on the subsets of auxiliary functions 10 and 30, as illustrated by FIG. 2B, by means of a hardware or software device 6. There are assumed to be n auxiliary functions, referenced $10_{a1}$, $10_{b1}$ ..., $10_i$, ..., $10_{n-1}$, $10_n$ and $20_{a1}$, $20_{b1}$, ..., $20_{i}$, ... $20_{n-1}$, $20_n$, respectively. If the device 6 is hardware, it comprises as many verification circuits $60_{a1}$, $60_{b1}$, ..., $60_i$, ..., $60_{n-1}$, $60_n$ (arbitrarily represented in FIG. 2B by the symbol of a comparator), as there are pairs of auxiliary functions to be verified, for example the verification circuit $60_i$ for the pair of functions $10_i$ and $30_i$. The output or outputs of this device 6, with the single reference 61, indicate(s) that the logical relation between all the possible pairs of corresponding auxiliary functions of the source 1 and transformed 3 codes is satisfied. This series of operations is enough to provide formal proof of the equivalence of the two codes in their entirety.

It must be noted that the method according to the invention is just as usable a posteriori, i.e. in order to verify an existing transformer, as it is a priori, as an aid in developing a new transformer. It specifically makes it possible, in the latter case, to determine its characteristics so that it works correctly, in other words so that the transformed code that will be generated by this transformer from the source code satisfies the aforementioned equivalence requirement.

Figure 3:
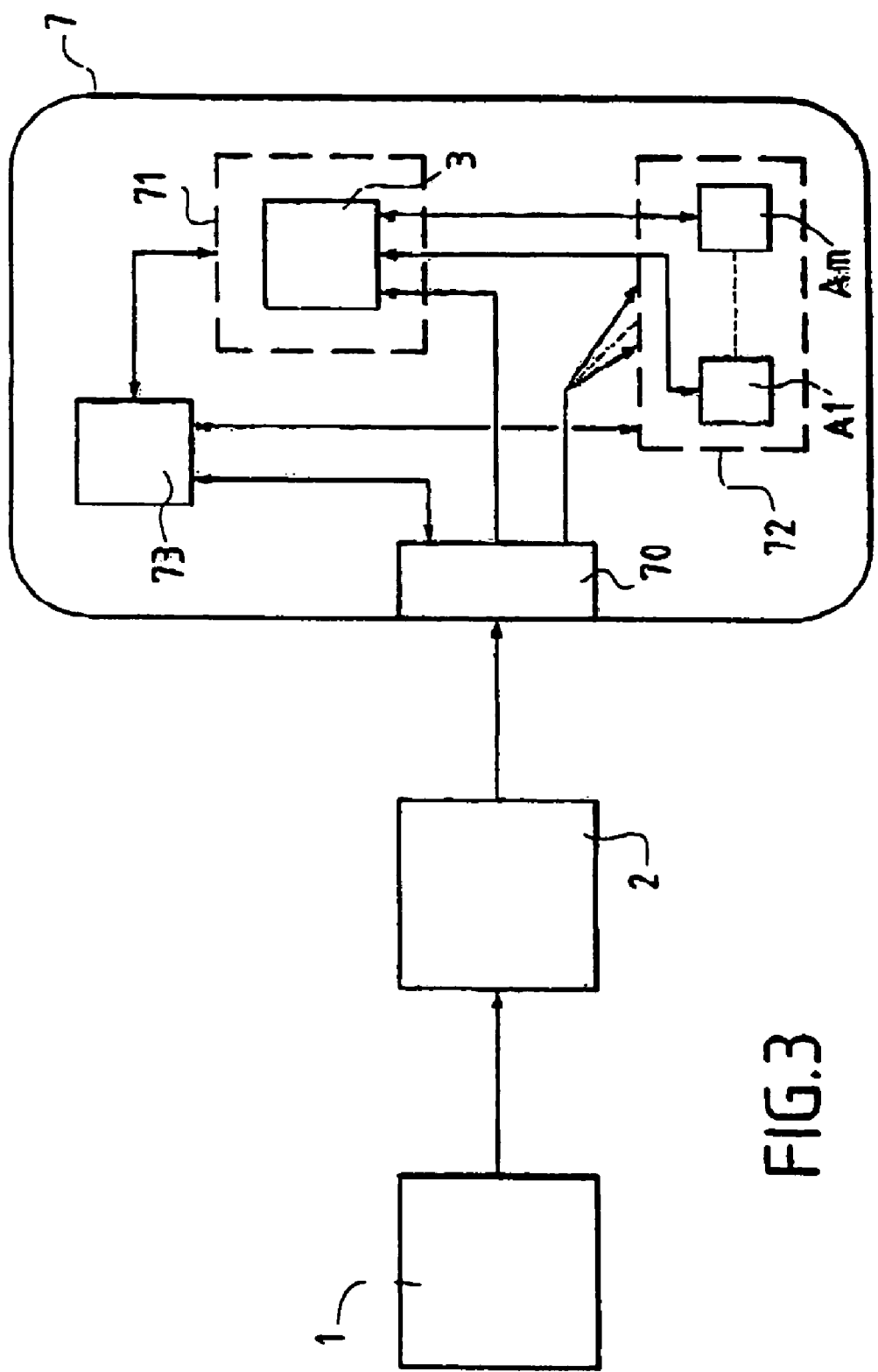
FIG. 3 schematically illustrates the application of the method according to the invention to a chip card.

The method will now be described in the chip card context. FIG. 3 schematically illustrates the architecture of a chip card, referenced 7. In this figure, only these elements essential to a proper understanding of the method according to the invention are represented.

The chip card 7 specifically comprises an input/output device 70 that allows communications with the outside world, a first fixed or programmable memory device 71 (of the ROM, PROM, EPROM or EEPROM type), and a read-write memory 72. Lastly, the chip card 7 comprises a microprocessor or microcontroller 73 that dialogues with the other components of the chip card 7 through a bus.

The software architecture of such a chip card 7 complies with the ISO 7816-3 standard, which translates into protocol layers ranging from the lowest layers associated with the input/output devices 70 to the highest layers associated with the software applications stored in the memory of the chip card 7. These standards provide for the transmissions to take place in the serial mode.

The source code 1, once transformed by the code transformer or converter 2, is transmitted to the chip card 7 in order to be stored, generally in the fixed or "semi-fixed" memory device 71 via the input/output device 70. The software application or applications run by the chip card 7 can be stored permanently in the chip card 7, i.e. in the memory device 71, or temporarily in the read/write memory 72. In the latter case, the applications are downloaded via the input/output device 70. In the example described, it is assumed that the chip card 7 is a multi-application or multi-user type card. It is therefore assumed that the chip card runs m software applications $A_1$ through $A_m$, written in the transformed language 3.

One of the languages commonly used for chip cards, as mentioned above, is the "Java Card" language. It is a language dedicated to chip card programming, a language that constitutes a limitation of the "Java" language.

The card 7 can also store an additional converter that performs conversions on code segments in situ as they load.

The steps of the method according to the invention that have just been described in a general context, will be illustrated more specifically within the context of the preferred application.

As is known, an installation of the "Java Card" language involves a transformer of converter means that transforms so-called "class" files into "CAP" files. A class file is a unit of complication and representation of the object code of a "Java" program. A CAP file groups all the classes of the same "Java Card package" and includes only one "constant pool." A "Java Card package" is a "Java" construction for grouping classes and creating name spaces. A "constant pool" is a table associated with each class file for "Java" and with each "CAP" file for "Java Card." This table contains constants (character strings, integers, etc.). It is used in "Java" and "Java Card" virtual machines. The transformation is nontrivial and global: it replaces all the names of packages, classes, fields, methods) with entities called "tokens," i.e., 7- or 8-bit whole numbers. These "tokens" serve as indices for accessing tables. In addition, the transformation groups all the class files of the same package into a CAP file (with a merging of the "constant pools" and a reorganization of the method tables).

The "Java Card" language is specifically designed to be used in banking chip cards. It is therefore imperative to verify the accuracy of the transformation of a program (or "byte code") written in the "Java" virtual machine into a program written in the "Java Code" virtual machine, i.e. to prove of the equivalence of these two programs.

This formal proof is provided by executing the steps of the method according to the invention.

The first step consists in defining a set of operational semantics.

One or more semantic rules are associated with each instruction of the "byte code." The "byte code" is a portable assembler code. It is the object code for "Java" or "Java Card" virtual machines. For example, the semantic rule associated with one of the instructions of this code, the "getfield" instruction, can be described as follows:

$f\_ref:=constant\_pool(c)(i)$ $<c\_ref, iv>:=h(\bullet)$ $v:=iv(f\_ref)$ $<\text{getfield } i; bc, r::ops,l,c,h> \Rightarrow <bc, v::ops,l,c,h>$ (9).

In the example, the state is composed of the code executed with the current instruction (getfield i; bc) leading, a stack of operands (r::ops), the local variables (l), a reference to the current class (c) and the heap (h). The rule specifies the operations performed during the execution of getfield i:

The auxiliary function "constant_pool" uses the index i to obtain the reference f_ref of the field (a signature or a "token," depending on whether it is a source code or a transformed code) in the appropriate "constant pool."

The reference• to the object whose field must be read is found at the top of the stack. This reference makes it possible to find in the heap (h(r)) the dynamic class of the object c_ref (a qualified name or a pair of tokens, depending on whether it is a source code or a transformed code) and a list of the fields of the object (iv).

Using the reference previously calculated and the list of fields, the field is read (v:=iv(f_ref)).

The getfield instruction changes the state by replacing the reference to the object with the value of the field, and the execution continues with the rest of the code (bc).

The second step consists in defining the types.

In the case of the "Java Card" language, it defines the Word type for representing the unit of storage:

$Word=Object\_ref+Null+Boolean+Byte+Short$ (10),

As an example of the constructed type, the type of a constant pool is:

$Constant\_pool=CP\_index\bullet CP \text{ info}$ (11), with $CP\_info=Class\_ref+Method\_ref+Field\_ref$ (12), In the example, a "constant pool" is seen as a function that takes an index (the type CP_index is considered to be basic) and renders an input (in this case a reference to a class, a method or a field).

The type of the "byte code" is:

Bytecode=Instruction+Bytecode; Bytecode $Instruction=getfieldCP\_index+\text{Invokevirtual } Cp\_index+$ (13), The "byte code" is an instruction sequence. The instruction type lists all of the instructions used in the "byte code" of "Java Card."

The third step consists in interpreting the types.

In the case of "Java Card," the interpretation for the source code, in the form of class files (which use names) is written $[[.]]_{name}$ and the interpretation for the transformed code, in the form of CAP files (which use "tokens") is written $[[.]]_{tok}$.

For example the type $[[CP\_index]]_{name}$ is verified for the source code:

$[[CP\_index]]_{name}=Class\_name \times \text{Index}$ (14).

In the name-based model, a "constant pool" index is constituted by a class name (to indicate the "constant pool" being referred to) and an index.

The type $[[CP\_index]]_{tok}$ is verified for the transformed code:

$[[CP\_index]]_{tok}=Package\_token \times \text{Index}$ (15).

A "constant pool" index is constituted by a "package token" (in the example described, there is only one "constant pool" per "package" or CAP file) and an index.

The relation $R_{CP\_index}$ is defined as a bijection such as: (16)

$(c\_name, i) R_{CP\_index}(p\_tok, i') => pack\_name(c\_name) R_{package\_ref} p\_tok$ The name of the "package" of the class containing the "constant pool" being referred to in the name-based module should be in relation with the "token" of the "package"

containing the "constant pool" being referred to in the "token"-based model. The only constraint on the indices i and i' is that $R_{CP\_index}$ must be a bijection (the inputs of the "constant pools" can then be regrouped and reordered).

The fourth step consists in interpreting the auxiliary functions.

For example, the version of the auxiliary function "constant_pool" for the name-based module is:

$$[[constant\_pool]]_{name} = cp\_name \quad (17),$$

with:

$$cp\_name\ c = let(\ldots, cp, \ldots) = env\_name(pack\_name(c))(c) \quad (18).$$

in cp

The function pack_name takes a class name and renders a "package" name, and the function env_name takes a package name and a class name and finds in the class hierarchy the structure representing the designated class file. The constant pool is extracted from the class file.

For the "token"-based model, the version of the auxiliary function $[[constant\_pool]]_{tok}$ is:

$$[[constant\_pool]]_{tok} = cp\_tok \quad (19),$$

with:

$$cp\_tok\ c = let(\ldots, cp, \ldots) = env\_tok(p) \quad (20),$$

in cp

The "constant pool" is found in the environment (i.e., the CAP files) by means of the function env_tok and the package token.

The fifth step consists of proving that the auxiliary functions satisfy the logical relations.

Referring again to the example of the function for accessing the "constant pool," it is necessary to determine that:

$$[[constant\_pool]]_{name}\ R\_cp\_index \cdot CP\_info[[constant\_pool]]_{tok} \quad (21).$$

The relation $R_{cp\_index} \cdot CP\_info$ is completely defined as a function of the relations $R_{cp\_index}$ and $R_{CP\_info}$. Based on this definition, one need only verify that:

$$\forall (c\_name, i)\ (p\_tok, i')\ such\ that\ (c\_name, i)\ R_{CP\_index}\ (p\_tok, i')\ cp(i)\ R_{CP\_info}\ cp'(i') \quad (22),$$

with:

$$(\ldots, cp, \ldots) = env\ name(pack\_name(c\_name))$$
$$(c\_name)$$

$$(\ldots cp', \ldots) = env\_tok(p\_tok) \quad (23).$$

The proof is based on the definition of $R_{CP\_info}$ and the property mentioned above: (24)

$$(c\_name, i)\ R_{cp\_index}(p\_tok, i') \Rightarrow pack\_name(c\_name)\ R_{package\_ref}\ p\_tok$$

The sixth and last step of the method consists of determining transformation is such that the transformation of the code and the data by the converter satisfies given logical relations. For example, the references to "packages" are either names or "tokens" depending on the model. The associated logical relation $R_{package\_ref}$ is simply defined as a bijection between the "package" names and the "package tokens." One need only verify that the function of the converter performing the transformation of the package names into "tokens" is actually a bijection.

By reading the above, it is easy to see that the invention achieves the objects set forth.

It must be clear, however, that the invention is not limited to just the exemplary embodiments explicitly described, particularly in relation to FIGS. 2 and 3.

Finally, although the method has been described in detail in the case of the transformation of a program of the "Java" virtual machine into a program of the "Java Card" virtual machine, which is particularly advantageous for chip card or similar applications, the invention is not in any way limited to this particular application.

The invention can be applied whenever the device involved has relatively limited computing resources, particularly in terms of memory size (read/write or fixed) and/or the computational power of the processor used. For example, it applies to electronic books, for example of the "e-book" type, designed to download and store data from Internet sites, palmtop computers, for example like the so-called "organizers," certain mobile telephones that can connect to the Internet, etc. In all of these cases, it is necessary to use an optimized language in order to use the integrated computing resources to best advantage.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method for verifying transformation of a source code into a transformed code designed for an embedded system, said source and transformed codes being associated with virtual machines comprising:
    determining, for each of said source and transformed codes, a first common subset, constituting a single virtual machine that factors in the behavior of said source and transformed codes;
    determining, for each of said source and transformed codes, a second subset constituted by a plurality of auxiliary functions used by said single virtual machine, said auxiliary functions representing residual differences between said source and transformed codes and parameterizing the single virtual machine;
    associating said auxiliary functions in pairs, a first auxiliary function of each pair belonging to said second subset associated with said source code and a second auxiliary function of each pair belonging to said second subset associated with said transformed code;
    verifying a given correspondence property between said auxiliary functions of all of said pairs; and
    verifying that said transformation of the source code into a transformed code satisfies said given correspondence property.

2. A method according to claim 1, wherein said correspondence property is a logical relation, so that said auxiliary functions of each of said pairs, when executed, generate results linked by said logical relation.

3. A method according to claim 2 further comprising applying the steps of the verification of transformation to a code transformer and generating from said source code, a transformed code in a memory of a chip card.

4. A method according to claim 3, wherein said transformed code is a program written in the virtual machine of a given computer language, and said chip card stores a plurality of software applications written in said transformed code.

5. A method according to claim 3, wherein said source code is a program written in a "JAVA" virtual machine and said transformed code is a program written in a "JAVA CARD" virtual machine.

6. A method according to claim 4, wherein said source code is a program written in a "JAVA" virtual machine and said transformed code is a program written in a "JAVA CARD" virtual machine.

7. A method according to claim 1, wherein said logical relation is an identity relation for observable entities of each of said source and transformed codes, for any pair of auxiliary functions, so that the functionalities of said source code are retained when said transformation into said transformed code, and said verification of the code transformation are performed.

8. A method according to claim 1 further comprising applying the steps of the verification of transformation to a code transformer and generating from said source code, a transformed code in a memory of a chip card.

9. A method according to claim 8, wherein said transformed code is a program written in the virtual machine of a given computer language, and said chip card stores a plurality of software applications written in said transformed code.

10. A method according to claim 8, wherein said source code is a program written in a "JAVA" virtual machine and said transformed code is a program written in a "JAVA CARD" virtual machine.

11. A method according to claim 9, wherein said source code is a program written in a "JAVA" virtual machine and said transformed code is a program written in a "JAVA CARD" virtual machine.

* * * * *